United States Patent [19]

Prud'Homme van Reine et al.

[11] Patent Number: 4,861,737

[45] Date of Patent: Aug. 29, 1989

[54] CERAMIC TRANSLUCENT MATERIAL, METHOD OF MANUFACTURING SUCH A MATERIAL AND HIGH-PRESSURE DISCHARGE LAMP PROVIDED WITH SUCH A MATERIAL

[75] Inventors: Peter R. Prud'Homme van Reine; Leonardus J. van Ijzendoorn, both of Eindhoven, Netherlands

[73] Assignee: U.S. Philips Corporation, New York, N.Y.

[21] Appl. No.: 178,119

[22] Filed: Apr. 6, 1988

[30] Foreign Application Priority Data

Apr. 10, 1987 [NL] Netherlands .................. 8700844

[51] Int. Cl.$^4$ ............... C04B 35/50; C04B 35/10; C04B 35/48
[52] U.S. Cl. .................................. 501/152; 501/103; 423/263; 423/600
[58] Field of Search ............... 501/152, 103; 423/263, 423/600

[56] References Cited

U.S. PATENT DOCUMENTS 3,767,745 10/1973 Gazza et al. .................. 423/600
4,331,627 5/1982 Yamamato et al. ............ 501/152
4,699,774 10/1987 Prud'Homme van Reine ... 501/152

*Primary Examiner*—Mark L. Bell
*Attorney, Agent, or Firm*—John C. Fox

[57] ABSTRACT

Ceramic translucent material mainly comprising densely sintered polycrystalline yttrium aluminum garnet in which between 20 and 1500 ppm by weight of $ZrO_2$ is added to the yttrium aluminum garnet. When manufacturing an article of such a ceramic translucent material, a thermal treatment is carried out at a temperature of more than 1400° C. in an oxidizing atmosphere after sintering.

1 Claim, No Drawings

CERAMIC TRANSLUCENT MATERIAL, METHOD OF MANUFACTURING SUCH A MATERIAL AND HIGH-PRESSURE DISCHARGE LAMP PROVIDED WITH SUCH A MATERIAL

The invention relates to a ceramic translucent material mainly comprising densely sintered polycrystalline yttrium aluminum garnet. The invention also relates to a method of manufacturing such a material and to a high-pressure discharge lamp provided with a discharge vessel having a wall of such a material.

Such an yttrium aluminum garnet (YAG) is known from British patent specification No. 2,138,802 (PHN10660). In order to obtain a satisfactory translucency of the yttrium aluminum garnet, small quantities of MgO and/or $SiO_2$ (50 to 1500 ppm by weight) are added during manufacture. The addition of such a sinter-dope results in the pores in the sinter material being closed and in the crystal growth of the material being influenced during sintering in such a way that the sintered material has a uniform crystal size. The translucency of the material is maximum at the theoretical density of the material (=100%). A density of more than 98% is achieved by using the materials MgO and/or $SiO_2$. In practice densities of less than 98% lead to such a low translucency that practical use as a material for the wall of a discharge vessel or as an optical window is excluded. Addition of the materials MgO and/or $SiO_2$ may have a negative influence on the resistance to, for example, sodium vapour when the ceramic material is used as a lamp envelope material. For example, the yttrium aluminum garnet with $SiO_2$ blackens under the influence of a sodium lamp atmosphere due to reduction of $SiO_2$.

Densely sintered polycrystalline yttrium aluminate garnet having a satisfactory translucency is known from U.S. Pat. No. 3,767,745. This material is obtained by hot pressing. In this method the starting material is sintered at a high temperature and at a high-pressure. Complicated equipment is required for this purpose. A great drawback is that tubular bodies such as discharge vessels cannot be obtained by this method.

The object of the invention is to provide a translucent ceramic material which can be obtained by sintering without using external pressure, which material can be used as a lamp envelope material and which is resistant to, for example, a sodium lamp atmosphere.

According to the invention the yttrium aluminum garnet as described in the opening paragraph is characterized in that the material comprises between 20 and 1500 ppm by weight of $ZrO_2$.

By addition of 20 to 1500 ppm by weight of $ZrO_2$ it is possible to densely sinter yttrium aluminum garnet without using external pressure, the density obtained being minimally 98% of the theoretical density so that a satisfactory translucency is obtained. The $ZrO_2$ dissolves satisfactorily in the yttrium aluminum garnet lattice so that the $ZrO_2$ already acts as a sinter-dope at low concentrations. Below 20 ppm by weight, however, the concentration is too low to give a reliable effect as a sinter-dope. If the $ZrO_2$ concentration becomes too high, that is to say, more than 1500 ppm by weight, a separation from a second phase may occur so that the translucency and the mechanical strength of the ceramic material may be influenced detrimentally.

The above-cited British patent specification No. 2,138,802 describes that MgO is possible for use as a sinter-dope when sintering yttrium aluminum garnet. The Mg-atoms are built in the lattice at Al-sites. In the U.S. Pat. No. 4,331,627 mentions $ZrO_2$ as a possible addition during sintering of aluminum oxide in which the Zr-atoms are also built in the lattice at Al-sites. When using $ZrO_2$ as a sinter-dope for yttrium aluminum garnet, however, the Zr-atoms are built in the lattice at Y-sites.

The Soviet Patent Specification No. 564,290 states the manufacture of yttrium aluminum garnet by means of sintering in vacuo for the purpose of obtaining laser material. To this end, for example 0.25 to 3.0% by weight of $ZrO_2$ is added. At such high $ZrO_2$ concentrations the separation from a second phase will generally occur in practice so that the material is not suitable as a wall material for a discharge vessel of a high-pressure discharge lamp due to the poor translucency of the material.

An article of the ceramic translucent material according to the invention is manufactured in accordance with a method in which a pulverulent mixture of mainly $Y_2(SO_4)_3$ and $Al_2(SO_4)_3$ is prepared by spray drying an aqueous solution of the said sulphates, whereafter the pulverulent mixture is heated to a temperature of 1150° to 1400° C. in an oxidising atmosphere so that yttrium aluminum garnet powder is formed, in that a deagglomeration operation is subsequently performed on the powder whereafter a sinter-dope is added and the assembly is brought to a desired mould which is subsequently sintered in an inert atmosphere at a pressure of at most 0.13 Pa or in hydrogen at a temperature of at least 1700° C., and is characterized in that the sinter-dope is added in the form of a Zr-compound and in that a thermal treatment at a temperature of more than 1400° C. is carried out in an oxidising atmosphere after sintering.

If the ceramic translucent material according to the invention is sintered by means of a method analogous to the method described in the above-cited British patent specification No. 2,138,802, the ceramic material has a red colour after the sintering process. If MgO is used as a sinter-dope when sintering yttrium aluminum garnet or if $ZrO_2$ is used as a sinter-dope when sintering aluminum oxide, the material is not coloured. This indicates that the Mg-atoms in the yttrium aluminum garnet lattice and the Zr-atoms in the aluminum oxide lattice are built in at other sites (namely Al-sites) than the Zr-atoms in the yttrium aluminum garnet lattice (namely Y-sites). Since the material has a red colour after sintering, it is less suitable for use as a wall material for a discharge vessel of a high-pressure discharge lamp. However, experiments have proved that the red colour of the ceramic material disappears again if the material is thermally treated at a temperature of more than 1400° C. in an oxidising atmosphere so that the material is still very satisfactorily usable as a wall material for a discharge vessel of a high-pressure discharge lamp.

Such a method in which the Zr-compound is added as a Zr-nitrate in a quantity corresponding to at least 20 ppm by weight and at most 1500 ppm by weight of $ZrO_2$ is preferred.

The ceramic material according to the invention may be used as an optical window under high temperature circumstances such as, for example, in reaction vessels. Preferably, the wall of a discharge vessel of a high-pressure discharge lamp is formed from a ceramic translucent material according to the invention. The material may be obtained in accordance with the method described hereinbefore.

The invention will now be described in greater detail by way of example with reference to a method of preparation and a number of measuring results.

In order to obtain stoichiometric $Y_3Al_5O_{12}$, $Y_2O_3$ is added in the correct quantity to a solution of $Al_2(SO_4)_3 \cdot 16H_2O$ in deionized water. Simultaneously $H_2SO_4$ is added in order to maintain the pH of the solution between 3 and 3.5. The solution of $Al_2(SO_4)_3$ and $Y_2(SO_4)_3$ obtained is spray dried. The powder thus obtained is fired for 2 hours at a temperature of 1300° C. so that the sulphates are converted into $Al_2O_3$ and $Y_2O_3$ and the finely divided oxide particles react to form $Y_3Al_5O_{12}$ (YAG). The fired powder is sieved and subsequently deagglomerated in ethanol. Subsequently the powder is dried at 600° C. The sinter-dope is added by mixing a quantity of $Y_3Al_5O_{12}$ powder with an adapted quantity of a Zr-nitrate solution in ethanol. The solution is subsequently evaporated to dryness. The powder obtained can be further processed by means of pressing or extrusion. For the purpose of measurements pellets were pressed of an accurately weighted quantity of powder (1.100 gram). The Zr-nitrate is converted into Zr-oxide during a presintering process at 300° C for 1 hour. Subsequently the sintering process takes place at 1450° C. for 2 hours, followed by a natural cooling in the furnace. The final sintering process is carried out in a $H_2$ atmosphere at a temperature of between 1700° and 1800° C. for 2 hours. The ceramic material obtained in this manner has a red colour (due to the sinter-dope $ZrO_2$). By thermally treating the material for 1 hour at a temperature of 1600° C. in an oxidising atmosphere (for example air) the red colour disappears and a satisfactorily translucent ceramic material is obtained.

Analogously to the method described above pellets were made of YAG without a sinter-dope, of YAG with 280 ppm by weight of MgO, of YAG with 70 ppm by weight of $ZrO_2$ and of YAG with 740 ppm by weight of $ZrO_2$. Different final sintering temperatures were used, namely 1700°, 1750°, 1800°, 1850° and 1880° C. Only the pellets comprising $ZrO_2$ as a sinter-dope were thermally treated.

Table 1 below shows the rectilinear tranclucency (RLD, in arbitrary units) of pellets made in accordance with the above-mentioned method in which different sinter-dopes and different final sintering temperatures were used. If no sinter-dope is used and the final sintering temperature is between 1700° and 1750° C., a material which is poorly translucent is obtained (RLD<0.20).

TABLE 1

| RLD Final sintering temp. (°C.) | Sinter-dope | | | |
|---|---|---|---|---|
| | None | 280 ppm MgO | 70 ppm $ZrO_2$ | 740 ppm $ZrO_2$ |
| 1700 | <0.20 | 0.33 | — | — |
| 1750 | <0.20 | 0.37 | 0.40 | 0.41 |
| 1800 | 0.20 | 0.39 | 0.41 | 0.43 |
| 1850 | 0.20 | 0.39 | 0.42 | 0.44 |
| 1880 | — | 0.57 | 0.40 | 0.52 |

In order to obtain a satisfactory translucency the density of the ceramic material should be 98% at a minimum. Table 2 shows the density percentages of the previously mentioned pellets.

TABLE 2

| Density (%) Final sintering temp. (°C.) | Sinter-dope | | | |
|---|---|---|---|---|
| | None | 280 ppm | MgO 70 ppm $ZrO_2$ | 740 ppm $ZrO_2$ |
| 1700 | <98.5 | 99.4 | — | — |
| 1750 | <98.5 | 99.8 | 99.7 | 99.7 |
| 1800 | 98.5 | 99.7 | 99.7 | 99.5 |
| 1850 | 98.5 | 99.8 | 99.9 | 99.7 |
| 1880 | — | 99.4 | 99.1 | 99.2 |

Pellets were subjected to attack tests whose results can be described with penetration depths of Na in the pellets. The pellets were made with $ZrO_2$ as a sinter-dope and without a sinter-dope using a final sintering temperature of 1800° C. The results of these tests are stated in Table 3.

TABLE 3

| Sinter-dope | penetration depth Na |
|---|---|
| none | approximately 15 μm |
| 70 ppm $ZrO_2$ | approximately 15 μm |
| 740 ppm $ZrO_2$ | approximately 15 μm |

What is claimed is:

1. A densely sintered translucent ceramic material consisting essentially of polycrystalline yttrium aluminum garnet and between 20 and 1500 ppm by weight of $ZrO_2$.

* * * * *